United States Patent
DeCou

[15] 3,658,427
[45] Apr. 25, 1972

[54] ATTITUDE SENSOR, AND SYSTEM FOR CONTROLLING ATTITUDE OF AN OBJECT

[72] Inventor: Anthony B. DeCou, Springdale Road, Cherry Hill, N.J. 08034

[22] Filed: Nov. 28, 1969

[21] Appl. No.: 880,617

[52] U.S. Cl. ...........................356/156, 356/110, 250/203, 244/3.16
[51] Int. Cl. .....................................................G01b 11/26
[58] Field of Search....................356/1, 141, 152, 110, 106; 250/203, 199; 343/9; 244/3.16

[56] References Cited

UNITED STATES PATENTS

| | | | |
|---|---|---|---|
| 2,523,398 | 9/1950 | Southworth | 343/9 |
| 3,375,750 | 4/1968 | Ellis et al. | 356/152 |
| 3,363,104 | 1/1968 | Waite et al. | 250/215 |
| 3,336,480 | 8/1967 | Raabe | 250/203 |
| 3,469,923 | 9/1969 | Mertz | 356/106 |

*Primary Examiner*—Rodney D. Bennett, Jr.
*Assistant Examiner*—S. C. Buczinski
*Attorney*—Howson and Howson

[57] ABSTRACT

Apparatus for sensing attitude of an object with respect to the direction of incident coherent light, by sensing the relative phase of such light at two spaced-apart points which are located adjacent the object and which move with the object. The relative phase of the light is sensed by producing interference fringes with the light picked-up at the two spaced-apart points. The position of the fringes on a surface is an indication of the relative phase at the two spaced-apart points and thus of the attitude of the object. For automatic control, the motion of the fringes is automatically sensed by photoelectric means to produce an electrical signal for controlling the attitude of the object in a manner to oppose departures from the desired attitude.

9 Claims, 8 Drawing Figures

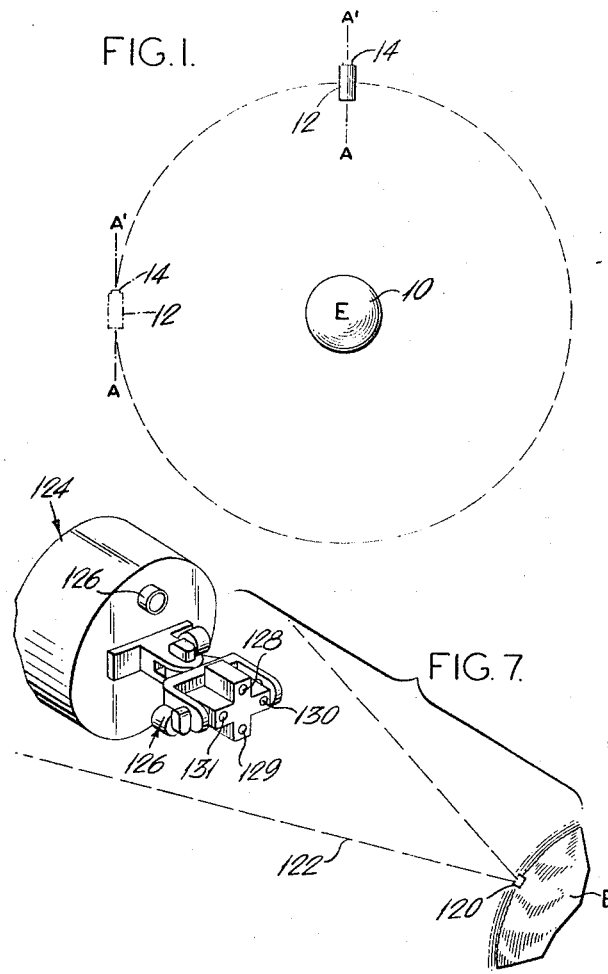
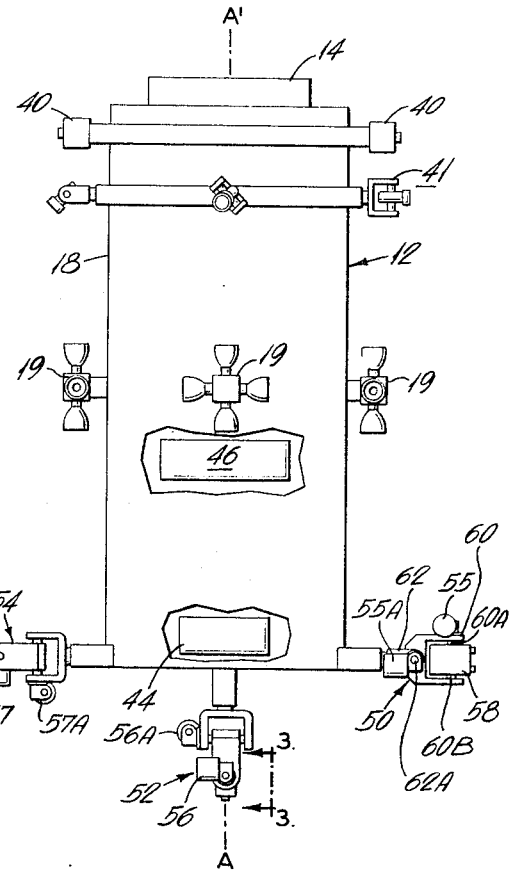
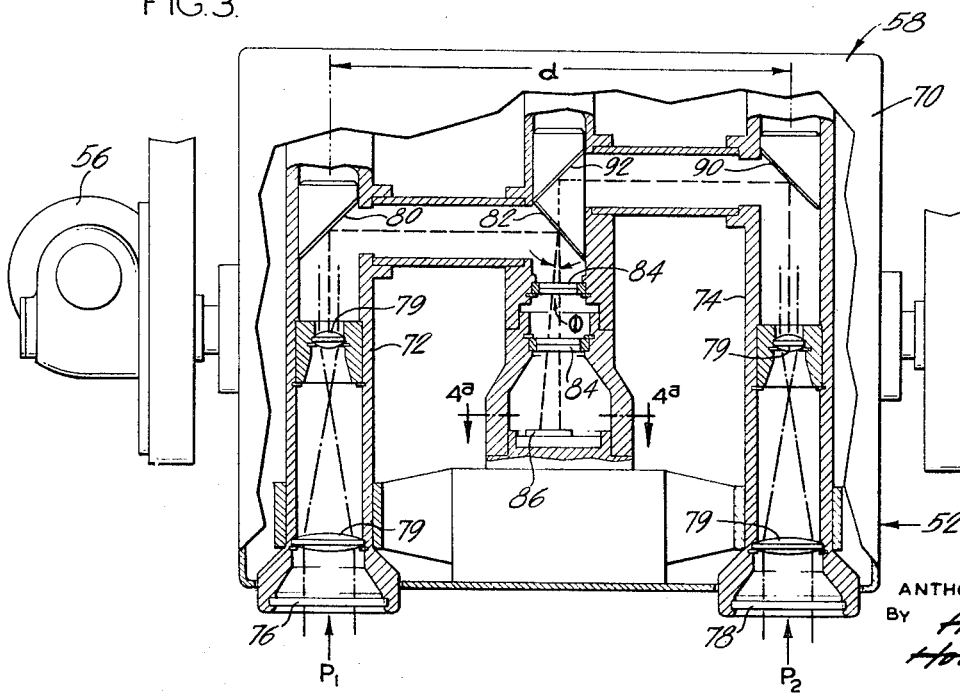

INVENTOR:
ANTHONY B. DeCOU
BY Howson & Howson
ATTYS.

ATTITUDE SENSOR, AND SYSTEM FOR CONTROLLING ATTITUDE OF AN OBJECT

BACKGROUND OF INVENTION

There are a variety of applications in which it is desirable to sense, and preferably to control, the attitude of an object with a high degree of precision. As an example only, in the case of a high-power astronomical telescope orbiting in space about the earth, it is often important to maintain the telescope pointing in precisely the same direction with respect to a particular object in its field of view, for example for the purpose of taking time-exposure photographs of a remote star over a long period of time on the order of hours. Another application occurs when a laser beam is to be used for communication purposes, in which case the narrow laser beam must be accurately pointed in order to maintain communication, particularly when a high signal-to-noise ratio is desired.

Other applications will occur to one skilled in the art wherein highly accurate sensing and/or control of attitude are important.

With respect to the orienting of an orbited astronomical telescope, it is known to provide apparatus for obtaining a first-order reading of the attitude of the telescope by searching for and locking on the sun and on another reference object such as the earth's horizon. It is also known to obtain more accurate second-order information as to attitude by means of star-tracker apparatus which, once the first-order attitude-sensing equipment has provided an approximate orienting of the vehicle, is able to locate and lock upon a predetermined set of bright distant stars, to sense the orientation of the vehicle with respect to the direction to these stars, and to modify the orientation of the vehicle so it will assume the desired exact position with respect to the stars to an accuracy of the order of about $10^{-4}$ degrees of arc. Such star trackers typically utilize a telescope for locating and locking on the selected star, and if angular accuracy of the order of $10^{-5}$ or $10^{-6}$ degrees were to be provided by such star trackers then the telescopes used in the star trackers would require about 30- to 60-inch objectives for a $10^{-5}$ degree accuracy and about 300- to 400-inch objectives for a $10^{-6}$ degree accuracy. The cost and complexity of putting into orbit a vehicle using star trackers having telescopes of such large sizes obviously makes this approach undesirable. On the other hand, if accuracies of $10^{-5}$ or $10^{-6}$ degrees in attitude are not provided, then the useful effective resolution of the main telescope is severely limited, particularly with respect to photographic long time-exposures intended to detect and record faint starlight. These difficulties might be overcome by using the main telescope for the star tracking and attitude determination task as well as for the photographic task, but this solution also has disadvantages which are known to those skilled in the art.

With respect to laser communication, one primary field of application is in connection with deep-space missions, wherein the vehicle traveling far into space is to remain in communication with an earth station or a space station on another space vehicle or on the moon, for example. One advantage of such laser communication is that, because of the extremely high frequency of the carrier-wave provided by the laser radiations, an extremely large bandwidth is available for the transmission of information on a laser beam; in some applications the privacy of communication by way of the laser beam is also of significance. There are advantages in making the laser beam-width as small as possible, thereby to decrease the necessary laser power at the transmitter and enhance the rate of transmission of information. However, in general, the narrower the laser beam the greater the accuracy with which it must be pointed toward the receiver, and for this reason a high degree of stabilization of the attitude of the vehicle, or at least of the portion thereof carrying the laser transmitter, is desirable.

Other applications will occur to one skilled in the art wherein instruments or other objects are advantageously held at a predetermined attitude with as high a degree of precision as is possible, as well as other applications in which, while it is not necessary to maintain the attitude fixed, it is important at least to obtain information indicative of variations in attitude.

Accordingly it is an object of the invention to provide new and useful apparatus for sensing the attitude or orientation of an object.

A further object is to provide such apparatus for sensing attitude of an object with respect to the direction of impingement of light thereon.

A further object is to provide such apparatus capable of providing extremely precise indications of variations in the attitude of an object.

It is also an object to provide such apparatus which does not require large bulky components, such as very large telescopes, in order to achieve accurate indications of attitude.

A further object is to provide such apparatus which is capable of providing electrical indications of attitude.

It is also an object of the invention to provide a system for automatically controlling the attitude of an object with a high degree of precision.

Another object is to provide a system of the latter type which is capable of providing such control with a high degree of precision, without requiring the use of extremely large telescopic apparatus or other similar apparatus of large bulk and weight.

SUMMARY OF THE INVENTION

In accordance with the invention these and other objects are achieved by the provision of apparatus for sensing the angular orientation of an object with respect to a source of light, comprising means fixed with respect to the object for receiving coherent light at two spaced-apart positions and means for comparing the phases of said light at said two positions to produce indications of changes in the relative phase thereof. When the object changes its angular orientation even slightly, the relative phase of the light arriving at the two spaced-apart positions will change correspondingly, and hence this relative phase constitutes an accurate indication of the angular orientation of the object, with a very high degree of precision.

In a preferred embodiment of the invention, the means for comparing the phases of the light at the two positions comprises means for directing the beams of light received at the two positions onto a common surface from different directions to produce optical fringes; shifts in the positions of these fringes are indicative of the relative phases of the two light beams. Preferably the position of the fringes is photoelectrically sensed to produce an electrical signal indicative of said relative phases.

In one preferred form of the invention the coherent light may be that from a distant luminous astronomical body after it has been subjected to filtering to limit the light used for the phase comparison to a narrow band of wavelengths, thereby to select a component of the incident light which has sufficient temporal coherence for the purposes of the invention. In another embodiment of the invention, the source of coherent light is a laser light source so positioned as to provide coherent light at said two positions adjacent said object.

In a further preferred form of the invention, the means for sensing the angular orientation of the object produces a signal which is then utilized to operate a control system, preferably to vary said angular orientation in a manner to oppose changes in the relative phase of the light at the said two positions and thereby maintain the orientation of the object substantially constant with respect to the direction of the incident light.

In one application thereof the invention may be used to stabilize the attitude of the optical axis of an astronomical telescope which has been placed in a synchronous orbit about the earth. For example, it may be utilized to maintain said attitude constant with respect to the fixed stars for a period of hours, within tolerances of the order of about $10^{-6}$ degrees of arc. In another principal application, it may be used to maintain the direction of a transmitted laser beam within similar limits of angular orientation in order to assure its reception at a distant receiver.

BRIEF DESCRIPTION OF FIGURES

Other objects and features of the invention will be more readily understood from a consideration of the following description taken together with the accompanying drawings, in which:

FIG. 1 is a schematic view showing the earth and an orbiting telescope-bearing vehicle, to which reference will be made in explaining one use of the invention;

FIG. 2 is an enlarged side elevation of the satellite vehicle of FIG. 1;

FIG. 3 is an enlarged view, partly in section, taken along lines 3—3 of FIG. 2;

FIG. 7 is a schematic representation illustrating another use for the apparatus of the invention.

DESCRIPTION OF SPECIFIC EMBODIMENTS

Figure 4A:
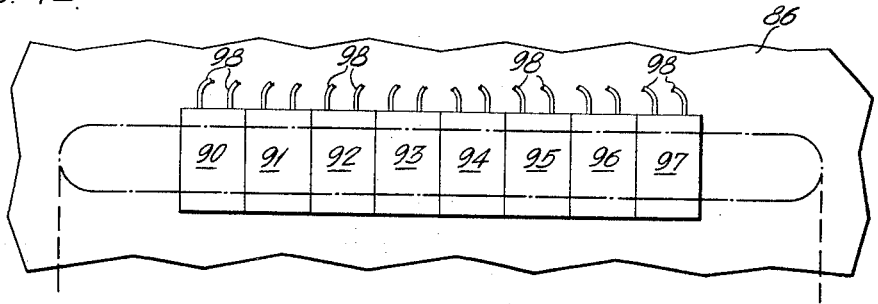
FIG. 4a is a fragmentary plan view taken along lines 4a—4a of FIG. 3.

Referring now to the specific embodiments of the invention shown in the drawings by way of illustration only, in FIG. 1 there is depicted schematically the earth 10, about which a satellite vehicle 12 containing an astronomical telescope 14 is in synchronous orbit, for example at a one-fourth of about 22,500 miles from the center of the earth. It is assumed for the purposes of the present example that the telescope is ultimately to be oriented with its optical axis A,A' directed at a remote star, and is to be maintained in this orientation for a long period of time during which a photographic time-exposure is to be made. For example, it may be maintained accurately in this orientation until it assumes the position shown in broken line in FIG. 1, in which case the time interval available for photographic exposure would be about one-quarter of a day, or 6 hours. The change in lateral position of the vehicle from start to end of exposure, even at a 22,500-mile distance from the center of the earth, is insignificant compared with the distance to a remote star, so that the axis A,A' is essentially parallel for the two positions of the vehicle shown in FIG. 1. In the case of a telescope with a 270-inch objective, the direction of the axis A,A' should be held fixed within about $10^{-6}$ degrees if all of the advantages of time-exposure photography are to be obtained. The vehicle is placed into synchronous orbit and oriented approximately along the axis A,A' by previously known techniques, and then maintained precisely in the desired fixed orientation by the method and apparatus of the present invention.

More particularly, referring to the schematic representation of FIG. 2, the vehicle 12 contains the astronomical telescope 14 fixedly mounted on the vehicle frame 18 and carries various orienting devices for the vehicle. These orienting devices include four conventional clusters of gas thrusters such as 19, disposed about the periphery of the frame 18 at 90° intervals, each cluster comprising two pairs of thrusters so that torques about any axis and in either sense can be applied to the vehicle frame by actuating various combinations of the thrusters in known manner.

It is assumed that the frame 18 carries appropriate known means 40 for causing the vehicle to execute a searching orientation to locate the sun and to align axis A,A' along a direction extending at right angles to a line to the center of the sun, and also to effect rotation of axis A,A' about the axis extending toward the sun to a known angular position, as by searching for and locking on the earth's horizon. Also carried by the frame 18 is a star-tracker system 41 which, after the first order alignment just described, is adapted to locate and lock on predetermined fixed remote stars and to enable controlled orientation of the vehicle until the main telescope 14 is directed so as to embrace the desired object in its field of view. Such apparatus and operations being well known, it will be unnecessary to describe them here in detail.

To effect such initial orientation, the signal derived by the sun-seeking, earth's-horizon-seeking, and star-tracking apparatus may be supplied to a suitable electronic control system 44 which responds thereto automatically to control the orientation of the vehicle by supplying appropriate signals to the various thrusters. For finer adjustment than is provided by the thrusters described above, and for long-term use under conditions in which dissipation of gas through the thrusters is functionally intolerable, there is preferably provided the fine attitude controlling apparatus 46 which typically may comprise controlled-moment gyros or inertia wheels of known form, by means of which the attitude and rate of rotation of the frame 18 are readily controlled. Such apparatus also being well known in the art, it will be unnecessary to show and describe it in detail.

For the present purposes it is assumed that the star tracking apparatus 41 is gimbal-mounted so that the star tracker may remain locked on the distant stars with respect to which it operates, while the main frame 18 is reoriented with respect to the direction defined by the star tracker, to the desired viewing position. It will also be understood that the electronic control system 44 includes appropriate means for establishing communication to and from a station on the earth to enable telemetering of data to earth from the vehicle, transmission of command signals to the vehicle from earth, and control of orienting devices on the vehicle from an earth station. Accordingly, by suitable command signals from earth the axis A,A' can be aligned to a first approximation along the desired predetermined direction for viewing the selected astronomical object through the main telescope.

The apparatus in accordance with the invention comprises the three gimbal-mounted attitude-sensing systems 50, 52, and 54, the portions of electronic system control 44 which supply signals to and from each of these attitude sensing systems, and appropriate control connections to the various vehicle-orienting devices and to the angle-sensing pick-off and torquer devices 55, 55A, 56, 56A, 57, 57A, located at the gimbal pivots of the three attitude-sensing systems. For example, the attitude sensing system 50 comprises an electro-optical attitude-sensing unit 58 mounted to pivot on an inner gimbal 60 and on an outer gimbal 62 supported on frame 18. As viewed in FIG. 2, the sensing unit 58 is thereby enabled to rotate freely about an axis vertical on the page and extending through pivots 60A, 60B, and about an axis extending normal to the page through pivot 62A. Attitude sensing systems 52 and 54 may be similarly arranged, but in this example are shown with their corresponding gimbal axes extending in directions at right angles to each other and to those of sensing system 50. Because of the gimballed arrangement of the attitude sensing units, each sensing unit may readily be oriented in response to command signals to point toward a corresponding different selected fixed star; once each sensing unit has located its corresponding star and placed it near the center of its field of view, the two gimbals of each sensing system are locked so that the sensing units such as 58 are rigid with respect to the vehicle frame 18. While this operation is taking place, the attitude of the vehicle is being controlled by the star tracking system 41. At this point, control of the vehicle is switched from the star trackers and the gas thrusters to control by the fine attitude sensing units such as 58 and to the fine attitude controlling apparatus 46, thereby to maintain the axis A,A' of the telescope more accurately in its desired fixed direction.

One preferred form for each of the attitude-sensing systems 50, 52 and 54 will now be described with particular reference to FIG. 3.

Referring now to FIG. 3, the attitude-sensing unit 58 comprises the supporting platform 70 mounted, as described generally above, on gimbals for motion with two degrees of angular freedom, and supporting the two sampling telescopes 72 and 74 with their optical axes parallel to each other and spaced apart by the distance $d$. In this example the optical axes of the two sampling telescopes are directed along the direction of incident light being received from a distant luminous body such as a remote fixed star, i.e. along the two substantially parallel light paths $P_1$ and $P_2$. Preferably, narrow-band optical filters 76 and 78 are provided in the paths of the incoming star light to improve the so-called "temporal" coherence of the received light. It will be understood that the distance $d$ is also less than the "spatial" coherence distance of the received light, which in the case of starlight is typically at least several meters, and in the present example the distance $d$ may be of the order of 1 meter. The purpose of the lenses 79 in telescopes 72 and 74 is to increase the intensity of the received radiation so that when it reaches the fringe detector it will be within the range of the detector sensitivity. The radiation entering the first lens of each telescope is made up of a bundle of parallel rays and the radiation leaving the second lens is made up of a smaller but more intense bundle of parallel rays; i.e. neither beam diverges or converges to any substantial extent. This is a well known type of telescope construction.

The beam $P_1$ from telescope 72 is reflected at 90° by the 45°-oriented mirror 80 fixed to platform 72, after which it is partially reflected from the beam-splitter mirror 82 and passed through a pair of conventional cylindrical lenses 84 to impinge upon the upper surface of the photoelectric fringe detector 86. Similarly, the received starlight passing through the telescope 74 is reflected from the 45°-oriented mirror 90 and again from the 45°-oriented mirror 92, so as to pass through the beam splitter mirror 82 and the pair of cylindrical lenses 84 and impinge upon the upper surface of the photoelectric fringe detector 86. However, the angular arrangement of the elements of the system is such that the rays in beam $P_1$ are directed upon the upper surface of the fringe detector 86 at an angle $\phi$ with respect to the rays impingent thereon in the beam $P_2$. This may be accomplished by positioning all of the mirrors at 45° with respect to the incident star light except for the beam splitter mirror 82, which departs from 45° by an angle $\phi/2$. The angle $\phi$ remains constant regardless of minor changes in the direction of the incident radiation from the star at telescopes 72 and 74. The purpose of the pair of cylindrical lenses 84 is to distort the normally circular star image into an elongated elliptical shape to match more efficiently the preferred configuration of the fringe detector, although such lens is not essential in all cases. The two beams of coherent light impingent upon the same upper surface of the fringe detector at slightly different angles of incidence produce interference fringes, as will be apparent from known physical considerations.

As shown in FIG. 4a, the photoelectric fringe sensor 86 may comprise a side-by-side array of eight photovoltaic devices numbered 90 through 97, each of which produces an output current to its corresponding pair of output leads, such as 98, having an intensity dependent upon the intensity of the light impingent thereon. The longitudinal axis of the array of photovoltaic devices extends normal to the interference fringes produced by the light incident thereon, so that the particular combination of outputs produced from the photovoltaic devices, at any given time, is indicative of the position of the fringes with respect to the photoelectric array.

Figure 4B:
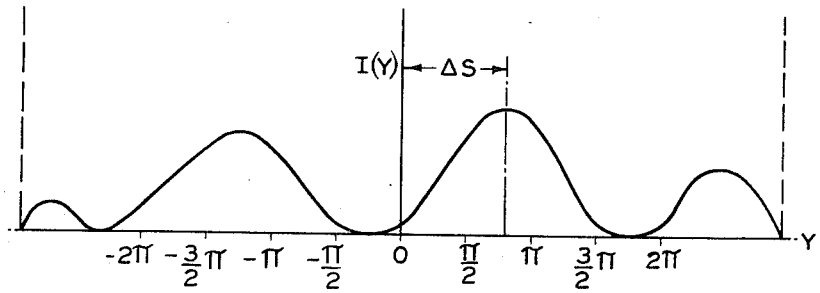
FIG. 4b is a graphical representation showing certain light distributions produced during operation of the invention.

For example, FIG. 4b is a graphical representation in which ordinates represent the net intensity $I$ of the light at the exposed surface of the photoelectric array and abcissae represent position $Y$ along the photoelectric array, to the same horizontal scale as in FIG. 4a. The horizontal scale in FIG. 4b is also marked with indications of angle in radians, representing the relative phase angle between the two incident light beams for different positions of the interference pattern along the photovoltaic array. That is, if one of the peaks of the intensity pattern of FIG. 4b lies on the zero axis of that graph, then the incident light beams are exactly in phase with each other at the upper surface of the photoelectric array. The fringe pattern shown in FIG. 4b therefore indicates a relative phase difference $\Delta S$ of about $\frac{3}{4}\pi$ radians.

Figure 6:
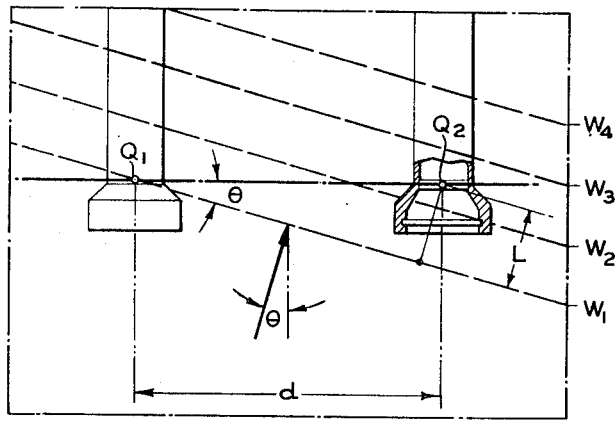
FIG. 6 is an idealized representation of a portion of a sensing unit, to which reference will be made in explaining the principle of the invention.

Referring to FIG. 6, from geometric considerations it will be seen that if $W_1, W_2, W_3$, etc. represent successive plane wavefronts of coherent light waves of wavelength $\lambda$ impingent on the points $Q_1$ and $Q_2$ a distance $d$ apart, if L is the length of the projection of d along the direction of wave propagation, and if $\theta$ is the angle between the direction of the incident wave and the normal to a straight line connecting $Q_1$ and $Q_2$, then:

$$\sin\theta = L/d, \tag{1}$$

and for small values of $\theta$, $$\theta = L/d \text{ radians}. \tag{2}$$

Also, $L = n\lambda + n'\lambda$, (3)

where $n$ is an integer or zero and $n'$ is a number between 1 and $-1$.

Further, the relative phase $\Delta S$ between the waves at $Q_1$ and $Q_2$, for phase differences less than $2\pi$, may be expressed as $$\Delta S = n'(2\pi) \text{ radians}, \tag{4}$$

so that, from equations (2), (3) and (4):

$$\theta = n\frac{\lambda}{d} + \frac{\Delta S}{2\pi}\frac{\lambda}{d} \tag{5}$$

In equation (5), $d$ and $\lambda$ are known constants and $\Delta S$ is measured by the photoelectric fringe detector 86, but $n$ is an unknown integer and hence the absolute angle $\theta$ is not determined. However, when angular variations $\Delta\theta$ within a range of less than 1 wavelength are considered, $n$ remains constant and $$\Delta\theta = \frac{\Delta S}{2\pi}\frac{\lambda}{d} \tag{6}$$

Accordingly, by measuring $\Delta S$ with the photoelectric fringe detector 86, electrical signals are produced which represent variations in the attitude of the attitude sensor unit 58 with respect to the direction of coherent light incident on the attitude sensor unit. This attitude variation will be measured around a sensing axis perpendicular to the direction of propagation of the radiation and the direction of the line connecting the two spaced-apart sampling points. Identical equipments in each of the other attitude sensing systems 50 and 54 provide signals representative of variations in their angles with respect to two other sensing axes determined by the directions to their stars and the line joining their spaced-apart sampling points. Knowledge of the attitude errors around these three axes is enough to determine completely the attitude error of the vehicle in three dimensional space.

Figure 5:
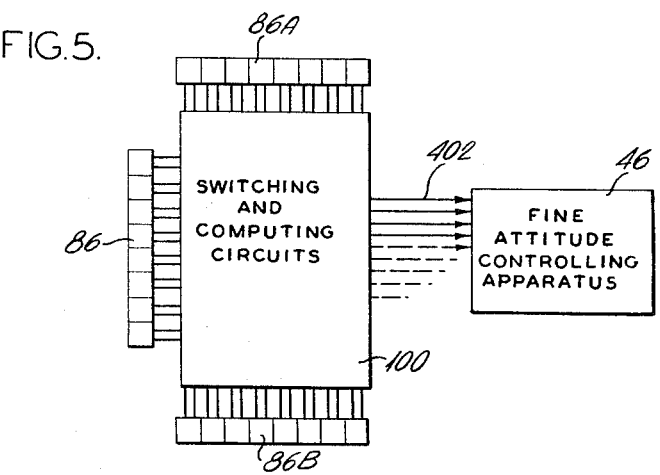
FIG. 5 is a block diagram showing one manner of connection of the apparatus of the invention into a system.

As represented in FIG. 5, the output signals from the photovoltaic devices of the three fringe detectors 86, 86A and 86B in the three attitude-sensing systems are supplied to switching and computing circuits 100. These circuits calculate the attitude error with respect to the axes around which the control torques are generated within the fine attitude controlling apparatus, and they generate appropriate control signals to be sent to the fine attitude controlling apparatus over lines such as 402; the latter apparatus in turn drives the attitude errors to zero by applying appropriate torques to the vehicle. This entire feedback procedure uses standard servo techniques.

In an alternative mode of operation, the attitude of the vehicle remains under the control of the star tracker and gas thrusters at all times; the more accurate attitude sensing system represented by this invention is then used to monitor the attitude of the vehicle and with this information to control a small part within the telescope, for instance a mirror, in such a way as to hold the image of the star to be photographed at a fixed position on a photographic plate (not shown).

If the intensity of the light falling on the fringe detector is great enough, the reading from each of the eight photovoltaic devices can be made continuously and supplied through the output leads as a continuous electrical signal. However, if the intensity of the radiation is not great enough for continuous readings and it is necessary to make more efficient use of the radiation available, this can be done by using integrating-type solid state detectors; i.e. detectors which accumulate a charge which is proportional to the total energy of the radiation that has fallen on them since they were last discharged. Periodically they are discharged, and the total amount of charge is recorded as the radiation intensity for that period. The readings for all eight photovoltaic devices then can be used to compute the phase difference of the two beams and the attitude error of the vehicle for that time period. If 20 such determinations are made per second, this is enough to produce an essentially continuous reading of the attitude error.

When utilizing the apparatus of the invention in the manner described above in detail, wherein the reference beam with respect to which attitude is sensed is obtained from a star, the following considerations are pertinent. Starlight is known to have a substantial degree of spatial coherence; that is, the light wave exhibits a high degree of phase correlation along its wave front, transverse to its direction of propagation, over a substantial distance. This distance, known as the coherence width, is approximately equal to $1.22 \lambda_o/A$ where $\lambda_o$ is the average wave length of the incident radiation and $A$ is the angle subtended by the diameter of the star from the position of the observer or observing equipment. Among the smaller values of coherence width which have been measured are values of 2 to 3 meters, and for most stars the value is much greater than this. For proper operation the distance between the two points fixed with respect to the vehicle at which the coherent light is received, corresponding to the distance $d$ in FIG. 3, should be less than the coherence width for the received light. Using a value of the latter distance $d$ equal to 1 meter, virtually any star in the sky will provide light with the required spatial coherence.

However, one difficulty with the use of starlight for the reference beam is that it does not normally possess a high degree of so-called temporal coherence, that is coherence along the direction of propagation of the wave. This is primarily because the natural star radiation normally contains a wide band of wavelengths of light. It is therefore desirable to operate the attitude sensing units in such a way that the two points at which light from the reference star is sensed are positioned so that a straight line between these points is very nearly perpendicular to the direction of the incident light, i.e. the two points should be substantially the same distance from the light source. As mentioned previously, the effective temporal coherence can be improved by utilizing relatively narrow band filters through which the incident light used for phase comparison is passed, although the narrower the bandpass of any such filter the less the amount of light passed and therefore the less the brightness available to work with in detecting the fringe position. Accordingly, the bandwidth of the filters utilized should be no narrower than is necessary to obtain the necessary degree of coherence.

For example, where the sampling point separation $d$ is 1 meter and the attitude of the space vehicle is stabilized by previously known arrangements to an accuracy of about 2 seconds of arc, a coherence length of about $9 \times 10^{-6}$ meters is adequate. Using a center wavelength $\lambda_0$ of about 5000 angstrom units, a spectral filter may suitably be utilized having lower and upper wavelength cutoffs of about 4871 and 5129 angstrom units, respectively. With this arrangement, relatively bright stars will produce adequate illumination for operation of a fringe detector using all solid-state components. If weaker stars are to be used as the sources of the reference light, image orthicon detectors may suitably be utilized in place of semiconductor devices to obtain a high degree of sensitivity.

The switching and computer circuits 100 may constitute printed-circuit or integrated circuit elements positioned on each sensor platform immediately adjacent the corresponding photoelectric fringe detector, or if desired may be included, in whole or in part, in the electronic control system unit 44.

In the construction of the attitude sensing system of FIG. 3, care should be taken to see that all elements are accurately alignable and positionable, stable in position in the presence of vibration, and protected from or compensated for temperature changes. By known techniques it is possible to maintain the system sufficiently stable that errors in the difference in the path length of the two sampled beams are less than $0.1 \lambda$, from which it can be calculated, using equation (6), that the sensing accuracy will be within about $\pm 3 \times 10^{-6}$ degree of arc.

While the invention has been described particularly with reference to sensing and utilizing variations occurring within a single wavelength of path-length difference, it is noted that, with the switching and computing circuits 100 so adapted, it is possible to count the number of times fringes pass through a given position on the photoelectric fringe detector and thereby obtain an electrical indication of angle variations corresponding to an integral multiple of a wavelength of path difference. The arrangement described above for sensing path-length variations of less than a wavelength will then provide information as to the angular deviation in excess of an integral number of wavelengths.

The information as to angular orientation or attitude may also be utilized for purposes other than attitude stabilization; for example it can be used to produce a very fine, controlled, orientation of the vehicle from one attitude to another, or even merely to derive information which is either utilized within the vehicle or transmitted to a remote station for use as raw data for experimental or control purposes.

If for example it is desired to take a time exposure of a remote star by means of the telescope 14, the optical axis of the telescope is locked into a position in which it is directed toward the desired target to be photographed, i.e. in the position represented in FIG. 1 in solid line, by means of previously known equipment. The attitude-sensing and control system of the invention is then activated and exposure of the photographic plate is begun through the main astronomical telescope 14. The system of the invention maintains the optical axis A,A' directed in the same direction with respect to the fixed stars until the vehicle reaches the position shown in broken line in FIG. 1, at which time the exposure may be terminated. During this interval the error in angular attitude is held to such small values, e.g. of the order of $10^{-5}$ or $10^{-6}$ degrees of arc, that the high resolution capabilities of the telescope are fully realized.

FIG. 7 represents schematically one other type of typical application of the invention, in which a laser source 120 on the surface of the earth directs a laser beam 122 outward from the earth in a manner such that the beam illuminates the entire satellite vehicle 124. This beam is then used as a source of coherent light which serves as an attitude reference, just as in the previously explained application. A laser 126 on the vehicle directs a laser beam outward parallel to the longitudinal axis of the vehicle, whereby when the vehicle axis is directed precisely toward the earth station the vehicle-mounted laser will direct its beam directly at the earth station.

In this application the vehicle 124 may carry a conventional control system (not shown) providing at least approximate orientation with respect to the laser beam, and in addition a first pair of spaced-apart beam samplers 128, 129 for sampling the incident laser beam at two spaced-apart points fixed with respect to the vehicle, and another pair 130, 131 of similar samplers spaced apart along a line extending at right angles to the line joining the sensors 128, 129 and at right angles to the axis of the laser beam 122. All four of the samplers may be directed forwardly along the axis of the vehicle. The apparatus may be like that described with reference to the system utilizing a star as the reference coherent light source, except that in this case filtering of the incident light is for the purpose of reducing the amount of background radiation which would otherwise enter the system and decrease the visibility of the fringes, especially if the system were looking at a sunlit part of the earth. Also, in this application there are only two pairs of samplers which act to adjust the attitude of the vehicle about only two axes, normal to the axis of the vehicle and to each other, without particular regard for control of orientation of the vehicle about its longitudinal axis. In order to control the attitude of the vehicle about the longitudinal axis with the same accuracy, it would be necessary to use another laser beam or starlight impinging on the vehicle from a direction widely separated from the direction of the first laser beam. However, for some applications, it is not necessary to stabilize the vehicle accurately around the longitudinal axis. An important example of such an application is the case illustrated in FIG. 7 where the purpose of the high accuracy of stabilization is to direct a laser-beam source 126 located on the vehicle toward the point on the earth from which the first laser beam originates for the purpose of communicating information from the vehicle to the earth. In this case, so long as the vehicle axis and the beam from the vehicle-mounted laser are parallel to each other, it is obvious that attitude stabilization around the longitudinal axis has little effect on the pointing accuracy of the vehicle-based laser beam and thus can be controlled by a much less accurate system.

To minimize deterioration of the coherence of the laser beam due to the atmosphere, the laser source 120 is preferably located at a high altitude, such as on a mountain top, in a dry geographical region, typically in locations now often used for astronomical telescopes, so as to minimize turbulence effects due to the atmosphere and interference by clouds.

With respect to such a system which utilizes a laser beam as an attitude reference, it is possible to determine the position of the interference fringes with an accuracy of at least one-tenth the distance between fringes, and assuming essentially perfect coherence between the light at the two sampling points at the receiving ends of the two telescopes of each of the sensor arrangements, and assuming a separation between each of the pairs of samples of about 1 meter and a laser light wavelength of $0.6943 \times 10^{-6}$ meter corresponding to the wavelength of a ruby laser, accuracy of about $\pm 4 \times 10^{-6}$ degrees of arc is obtainable according to equation (6). Shorter wavelengths, larger $d$, and greater accuracy of measurement of fringe position will further increase the accuracy of the system.

In one preferred form of the system indicated in FIG. 7, the laser source may be a ruby laser pulsed at a rate of 20 pulses per second and at about 0.5 joules of energy per pulse, and solid state photoelectric fringe detectors may be used in the attitude sensors on the vehicle. Particularly where a pulsed laser source is utilized, the photoelectric fringe detectors may be of the integrating type in that they cause the accumulation of a charge which increases through the time during which they are illuminated, until they are discharged. In order to minimize interference, it will normally be advantageous to discharge the detectors immediately before each received pulse, to charge them during the reception of each pulse, and to discharge them again immediately after each pulse to obtain a reading indicative of fringe position. This may be accomplished at a rate of 20 determinations per second to provide the requisite control information. While eight discrete photoelectric fringe detector elements have been shown, this number is actually in excess of that actually required; however, the use of this redundent number of elements improves the reliability of the system.

With respect to data as to absolute orientation, it has been pointed out above that the systems thus far described in detail are primarily of interest in determining variations from a reference orientation. However, in those applications where a high degree of accuracy of absolute angular position is important, as where it is desired to point a highly collimated laser beam at a particular target point on the surface of the earth in order to establish a communication channel, it is possible to provide such information by means of a feedback system operating between the satellite and the earth. This can be accomplished by causing the transmitted beam to execute an area-scanning of the earth and by causing a signal to be sent back to the satellite from the earth when the beam strikes the target point on earth. The angle in the scanning operation for which the target-produced signal is received at the satellite will provide an indication of the exact absolute direction, along which the optical axis of the transmitting laser should be oriented to provide communication with the earth station, and this direction can then be used as the reference direction with respect to which automatic attitude control is provided by the system outlined above.

Accordingly, while the invention has been described in the interest of complete definiteness with respect to specific embodiments thereof, it will be understood that it may be embodied in a variety of forms diverse from those specifically described without departing from the invention.

What is claimed is:

1. Apparatus for sensing the angular orientation of an object with respect to a source of light, comprising:
   means secured to said object for receiving coherent light from a common source at two spaced-apart positions;
   means for comparing the phases of said light at said positions to produce indications of changes in the relative phase thereof;
   said means for comparing phases comprising means for superimposing said light from said two spaced-apart positions to produce optical fringes indicative of said relative phase; and
   photosensitive means impinged by said superimposed light for sensing changes in the positions of said fringes and for producing electrical signals representative thereof.

2. Apparatus in accordance with claim 1, wherein said photosensitive means comprises a plurality of adjacent electrically separate photosensitive elements and corresponding separate electrical connections to said elements.

3. Apparatus in accordance with claim 2, comprising computer means supplied with said electrical signals for performing computation functions to produce an output signal representative of said relative phase.

4. Apparatus in accordance with claim 1, in which said phase-comparing means comprises means for directing light from said two positions at different angles onto a common surface.

5. Apparatus in accordance with claim 1 comprising a laser light source, said coherent light comprising light from said source.

6. Apparatus for sensing the angular orientation of an object with respect to a source of light, comprising:
   means secured to said object for receiving coherent light at two spaced-apart positions;
   means for comparing the phases of said light at said positions to produce indications of changes in the relative phase thereof;
   in which said receiving means are controllably orientable toward a distant luminous astronomical body to receive light therefrom, said apparatus comprising optical filter means for limiting light applied to said phase-comparing means to a narrow band of wavelengths such that light from said astronomical body is temporally coherent at said receiving means.

7. The method of sensing the angular orientation of an object with respect to a luminous body comprising filtering light received from said body, at two adjacent locations fixed with respect to said body, to a degree sufficient to produce substantial temporal coherence of said light at said two locations, and comparing the phases of said filtered light.

8. The method of determining the angular orientation of an object, comprising orienting said object to receive light at two locations thereon from a common source of coherent light and measuring the relative phase of said light at said two locations, and orienting said object so that light is received at said two locations from a luminous astronomical body.

9. Apparatus for controlling the angular orientation of an object, comprising:
   means secured to said object for receiving coherent light from a reference source at two spaced locations fixed with respect to said object;

means for comparing the phases of said light at said two locations to produce signals representative of the relative phase of said light at said two locations; and control means responsive to said signals to rotate said object in a direction to oppose changes in said relative phase;

in which said phase-comparing means comprises means for directing coherent light from said two locations onto a common surface region from different angles to produce optical fringes having positions representative of said relative phase, and photosensitive means responsive to said fringes to produce electrical signals representative of said relative phase, said control means comprising computer means supplied with said signals for producing a control signal indicative of the magnitude and polarity of departure of said relative phase from a reference value, and torquing means supplied with said control signal to rotate said object.

* * * * *

UNITED STATES PATENT OFFICE
CERTIFICATE OF CORRECTION

Patent No. 3,658,427        Dated April 25, 1972

Inventor(s) Anthony B. DeCou

It is certified that error appears in the above-identified patent and that said Letters Patent are hereby corrected as shown below:

Column 3, line 35, delete "one-fourth" and insert therefor -distance-

Signed and sealed this 17th day of October 1972.

(SEAL)
Attest:

EDWARD M.FLETCHER,JR.        ROBERT GOTTSCHALK
Attesting Officer               Commissioner of Patents